May 15, 1962 H. STEVENSON ETAL 3,034,811
SECURING OF SLEEVES ON SHAFTS
Filed Feb. 24, 1958
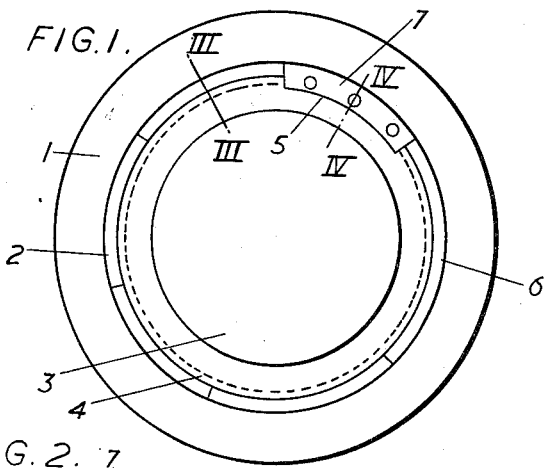
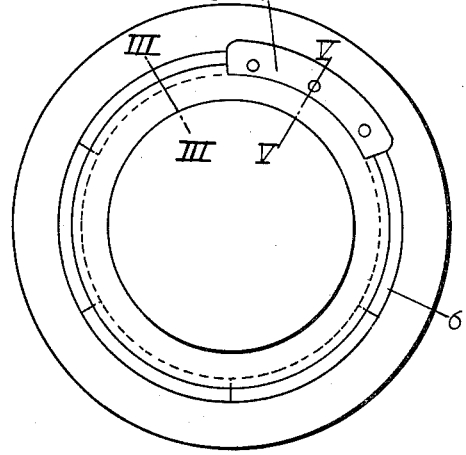
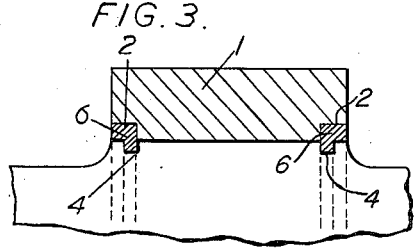
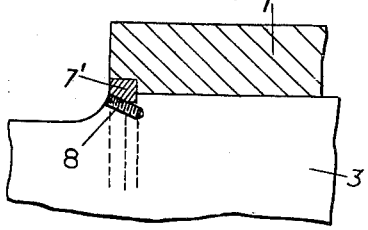
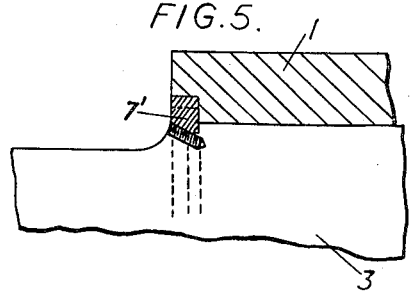
*Inventor*
HARRY STEVENSON
THOMAS WILLIAM PEASE
*Attorney*

United States Patent Office 3,034,811
Patented May 15, 1962

3,034,811
SECURING OF SLEEVES ON SHAFTS
Harry Stevenson, Handsworth, Sheffield, and Thomas William Pease, Rotherham, England, assignors to Hadfields Limited, Sheffield, England
Filed Feb. 24, 1958, Ser. No. 717,226
Claims priority, application Great Britain Feb. 25, 1957
3 Claims. (Cl. 287—52.07)

This invention relates to sleeve and shaft assemblies by which is meant any assembly comprising a shaft and another member which fits around it.

In the manufacture of certain shaft and sleeve assemblies it is customary to shrink one piece on to the other so as to ensure a substantially positive interference fit when the two members are assembled.

In many cases the retaining force thus developed is sufficient to ensure that no movement of one piece will take place with respect to the other piece under dynamic conditions of service. There are, however, many applications where difficulties are encountered due to relative axial and/or circumferential movement of the two pieces.

These difficulties cannot be overcome satisfactorily by increasing the interference fit since the increased stress consequently produced may promote mechanical failure.

The object of the invention is to provide in addition to any interference fit which may be desired, a positive resistance to movement at least laterally and, preferably, both axially and circumferentially.

Resistance to axial movement is achieved by providing at each end of the sleeve part an abutment in the form of a circumferential ring. At least one of these rings has necessarily to be built up after the sleeve and shaft have been assembled and, to make that possible it is formed of a number of segments engaged in a circumferential groove in either the sleeve or shaft and an annular recess for the other. A slot is provided communicating with the groove to allow each segment in turn to be engaged in the groove and then moved circumferentially in the groove to make room for another segment. The final or "closing" segment can be shaped so as to fill both the slot as well as the groove and if this is done where the slot is in the shaft the composite ring will be held against circumferential movement. To keep the closing segment in position it is secured by means of set screws.

In order to prevent circumferential movement of the sleeve relatively to the shaft either the sleeve or the shaft can have a recess formed in it which lies opposite the slot in the other part and the closing segment is made to fit the recess.

In the preferred construction the grooves and the slot for inserting the segments into the groove will be in the shaft and the recess will be a counterbore in the sleeve.

The invention can be usefully applied, for example, to a composite back-up roll such as is used in the rolling industries. A typical roll would be in the form of a sleeve of a length of 80 inches and an outside diameter of 54 inches mounted on a 35-inch diameter shaft. It is highly desirable that there should be no movement whatever of the sleeve relatively to the shaft, either laterally or circumferentially, even under the most onerous working conditions.

The application of the invention to such a case is shown in the drawings in which:

FIG. 1 is an end view of the shaft and roll,

FIG. 2 is an end view of the shaft and roll showing an alternative form of closing member, FIG. 3 is a section on the lines III—III of FIGS. 1 and 2, FIG. 4 is a section on the lines IV—IV of FIG. 1, and FIG. 5 is a section on the lines V—V of FIG. 2.

In FIGURES 1 and 3, each end of the sleeve is counterbored at 2 and the shaft 3 is formed with grooves 4 which, with the counterbores, form composite grooves of L-shaped cross-section (FIG. 3) when the sleeve is fitted on to the shaft.

The shaft is cut away over an arc, the length of which is dependent on the size of ring segment adopted, to provide a slot 5 giving access to the composite groove.

For locking the sleeve on the shaft there are provided a number of segments 6 of the same cross-section as the composite groove. These are inserted one by one into that groove through the slot 5 and turned into the positions shown in FIGURE 1. Finally, the ring of segments is completed by a closing segment 7 which, as shown in FIGURE 4, fits both the groove and the slot 5. This closing segment is secured in position by set screws 8 passing through it into the shaft.

It will be seen that the sleeve is then held positively against lateral movement relatively to the shaft, the outer sides of the grooves in the shaft providing positive abutments.

The alternative form of closing segment 7' in FIGURE 2 extends into a slot provided for it in the sleeve 1 and thereby provides additionally for prevention of circumferential movement.

We claim:

1. A sleeve and shaft assembly comprising a shaft, a sleeve fit on said shaft, means disposed at each end of said sleeve for preventing axial movement of the sleeve relative to the shaft, at least one of said means comprising a circumfrential groove in said shaft, an annular recess in said sleeve adjacent said groove, a plurality of segments forming a continuous ring disposed in said recess and projecting into and engaging with said groove, and a slot disposed adjacent said groove and opening into the groove to permit insertion of said ring segments.

2. A sleeve and shaft assembly as claimed in claim 1 wherein said ring segments are the same size as said slot.

3. A sleeve and shaft assembly as claimed in claim 1 wherein said annular recess has a further recess in one wall thereof and disposed adjacent to said slot, and the last of said segments forming the ring engages with both said slot and said last named recess, whereby circumferential movement of the sleeve relative to the shaft is prevented.

References Cited in the file of this patent

UNITED STATES PATENTS

| 582,481 | Nolan | May 11, 1897 |
| 861,143 | Scott | July 23, 1907 |
| 1,037,171 | Rust | Aug. 27, 1912 |
| 1,217,804 | Metzger | Feb. 27, 1917 |
| 1,487,279 | Silvis | Mar. 18, 1924 |